(12) United States Patent
Goldman et al.

(10) Patent No.: US 9,205,465 B2
(45) Date of Patent: Dec. 8, 2015

(54) HIGH THROUGHPUT ROOT WASHING METHOD, APPARATUS, AND SYSTEM

(75) Inventors: Daniel M. Goldman, Des Moines, IA (US); Xiaomu Niu, Johnston, IA (US)

(73) Assignee: PIONEER HI BRED INTERNATIONAL INC, Johnston, IA (US)

( * ) Notice: Subject to any disclaimer, the term of this patent is extended or adjusted under 35 U.S.C. 154(b) by 1096 days.

(21) Appl. No.: 13/154,141

(22) Filed: Jun. 6, 2011

(65) Prior Publication Data

US 2011/0297191 A1  Dec. 8, 2011

Related U.S. Application Data

(60) Provisional application No. 61/352,707, filed on Jun. 8, 2010.

(51) Int. Cl.

| | | |
|---|---|---|
| *B08B 3/02* | (2006.01) | |
| *B08B 3/14* | (2006.01) | |
| *B08B 3/04* | (2006.01) | |
| *B08B 3/00* | (2006.01) | |
| *A01G 7/00* | (2006.01) | |

(52) U.S. Cl.
CPC . *B08B 3/024* (2013.01); *B08B 3/14* (2013.01); *A01G 7/00* (2013.01); *B08B 3/00* (2013.01); *B08B 3/02* (2013.01); *B08B 3/04* (2013.01)

(58) Field of Classification Search
CPC .............. A01G 7/00; B08B 3/00; B08B 3/02; B08B 3/024; B08B 3/04

USPC .......... 426/506, 806; 47/1.01 R, 1.5, 58.1 R, 47/58.1 SE, 58.1 FV; 134/32, 42
See application file for complete search history.

(56) References Cited

U.S. PATENT DOCUMENTS

| | | | | |
|---|---|---|---|---|
| 2,156,840 | A | * | 5/1939 | Davis .............................. 134/63 |
| 4,063,384 | A | * | 12/1977 | Warren et al. .............. 47/58.1 R |
| 4,355,433 | A | * | 10/1982 | Dietrich .......................... 15/302 |
| 5,352,298 | A | * | 10/1994 | Moulder .................... 134/22.18 |
| 5,858,435 | A | * | 1/1999 | Gallo ............................ 426/320 |
| 6,601,527 | B2 | * | 8/2003 | Gow et al. ..................... 111/100 |
| 2006/0054718 | A1 | * | 3/2006 | Yen ................................ 239/337 |

(Continued)

OTHER PUBLICATIONS

De Jesus, et al.; *The Use of Neutron Radiography in Agriculture to Improve The Food Quality*; Cellular and Molecular Biology; 2002; pp. 819-821; vol. 48.

(Continued)

*Primary Examiner* — Bibi Carrillo
(74) *Attorney, Agent, or Firm* — Pioneer Hi-Bred Int'l., Inc.

(57) ABSTRACT

The present invention provides a method, apparatus, and system for efficient, high throughput, consistent cleaning of soil from the root system of a plant. In one embodiment, the method generally comprises positioning a plant adjacent a sprayer assembly having at least one nozzle angled so as to impact the root system at a predetermined position, providing a stream of water from a reservoir through the nozzle of the sprayer assembly, and rotating at least one of the root system and the nozzle relative to the other to remove the soil from the root system. The present invention further describes a recycling system adapted to recycle water expended during the cleaning process to minimize losses and to capture and return dislodged soil to the field from which the plant is extracted.

20 Claims, 4 Drawing Sheets

(56) References Cited

U.S. PATENT DOCUMENTS

2008/0086941 A1* 4/2008 Nottingham ............... 47/32.7
2008/0241323 A1* 10/2008 Kelsey et al. ............... 426/318
2009/0269453 A1* 10/2009 Cypher et al. ............... 426/482

OTHER PUBLICATIONS

Townsend, et al., *A comparison of rooting environments in containers of different sizes*; Plant and Soil, 1995, pp. 139-146, vol. 175.
http://www.ars.usda.gov/research/publicatoins/publications.htm?SE Research Project: Dryland Cropping Systems Management for The Central Great Plains site visited May 20, 2011 (2 pgs.).
Spraying Systems Co.®; Technical Reference; Spray Performance Considerations; pp. A1-A12.
Gillisons, "GVF Rootwasher Hydropneumatic Elutriation System", Gillison's Variety Fabrication, Inc., (2010).
Benjamin, A Method to Separate Plant Roots from Soil and Analyze Root Surface Area, Plant and Soil, (2004), 267:225-234.
Metcalfe, "A Method for Extracting Plant Roots from Soil which Facilitates Sample Processing without Comprising Measurement Accuracy", New Phytologist, (2007), 174:697-703.
Chotte, "A Modified Hydropneump-Elutriation Apparatus for Quantitive Root Separation from Large Soil Core Samples", Commun Soil Sci Plant Anal. (1995), 26:15&16, 2703-2709.
Delta, "Root Washer", At Delta T Devices Instruments for Ltd Environmental and Industrial Measurement, (unknown date), 1-14.
Hoskin, "Plant Science Instrumentation", Hoskin Plant Catalog, 2001, 1-3, 66.
Douglas, "Cyclone Belt Washer", Douglas Machine Corp., 2005, 1-2.

* cited by examiner

HIGH THROUGHPUT ROOT WASHING METHOD, APPARATUS, AND SYSTEM

CROSS-REFERENCE TO RELATED APPLICATIONS

The present application claims priority from U.S. Provisional Application No. 61/352,707 filed Jun. 8, 2010, which is hereby incorporated herein by reference in its entirety.

FIELD OF THE INVENTION

The present invention relates in general to methods, apparatuses, and systems for automated high throughput cleaning of plant roots.

BACKGROUND OF THE INVENTION

Studying the roots of plants during the growing process provides a wealth of information regarding plant physiology for the purposes of plant breeding, such as for example corn, or other crops, as well as detecting the presence of parasites or other harmful external sources. Studying the physiology of plant growth root structure provides an indication of, for example, absorption of nutrients or standability during growth. Plant roots can also be analyzed to determine growth factors of the plant, which may be based on root stricture, or the plant's to ability to absorb nitrogen from the soil. Parasites or other insects may also be present in the soil where the sample is grown and these parasites, or their effects, show up in the roots of growing plants. To determine the effectiveness of parasite control, sample plants may be extracted and their roots analyzed for damage due to such parasites.

Prior to performing any such analysis, the plant must be extracted from the soil and soil clinging to the roots must be removed. In the past, removing soil from corn and other plant roots was accomplished manually by an individual who used a single nozzle hose to spray one root at a time. In addition to being inefficient, this manual approach was not ergonomic as it required the individual to perform many repetitive and arduous tasks. Various root cleaning machines (shakers, barrel types, etc.) have been published, but are not effective, nor provide high enough throughput to clean a sufficient number of roots to support certain research efforts during a window of optimum sampling. Therefore, there is a need in the research field to provide a method and apparatus able to provide high throughput cleaning of corn or other plant roots in order to facilitate research.

The roots of corn or other plants vary in size and strength, and care must be taken to effectively remove all of the soil (including rocks and debris) from stronger plant roots while preserving the integrity of finer roots. Various types of analyses may focus on either the stronger or finer roots and so it is desirable to preserve the integrity of and remove soil from all of the roots in order to provide the most effective sample for testing. Therefore, there is identified a need in the research field to provide a cleaning mechanism which may effectively remove the soil from the root structure of corn or other plants while preserving the integrity of finer roots.

In previous methods of cleaning plant roots, a single operator would utilize a hand held hose providing water flow at a high pressure. Such work is dangerous, requiring operators to utilize various safety equipment to protect themselves from harm. Therefore, there is a need in the root cleaning process to provide a method and apparatus requiring minimal human intervention so as to minimize safety risks.

In previous cleaning operations, the amount of soil that could be removed varied from one operator to another or from one plant to another, and also depended on the operator's experience, the moisture content of the soil surrounding the roots, and/or the consistency of the soil. Some roots may have been cleaned so that all of the soil was removed from the plant, while at other times an operator may have found it impossible to remove all of the soil from the root while preserving the fine roots. Therefore, there is identified a need for a method and apparatus which provides consistent cleaning of soil from plant roots.

A further problem with previous systems for cleaning roots involves the loss of a significant amount of soil from the field in which the plants are initially grown. Soil in a particular field may be engineered to have a certain nutrient value or other desired qualities and the loss of a significant amount of soil may compromise a testing environment. Transporting and depositing of soil can be an expensive endeavor, and while soil may also be replaced in the field, this too represents an expense which may be avoided. Therefore, a need has been identified in the industry for providing a method and apparatus which is capable of removing soil from a plant root and returning the soil to the field.

In extracting and cleaning a plant in order to minimize soil loss from the field, water supply may be at a premium. For example, if root cleaning is performed in the field, water may need to be available in the field or transported to the field. Additionally, even in a separate environment, it may be preferable to conserve water if possible. Such a conservation system may limit the expense for utilities. Therefore, a need has been identified for a system of recycling or conserving water used to clean soil from a plant root system.

SUMMARY OF VARIOUS EMBODIMENTS

In accordance with the present invention, the disclosed root cleaning method, apparatus, and system substantially reduce or eliminate the disadvantages and shortcomings associated with prior art techniques and provide certain advantages as disclosed herein.

According to one aspect of the invention, an automated, high throughput, sprayer assembly is disclosed featuring one or more nozzles directed inwardly towards a plant root system to effectively, controllably, and in a high throughput manner, remove soil from the root system. The nozzles preferably rotate about a common axis to provide cleaning about the root system. As such, a balance is achieved between flow, pressure, and spray pattern used.

According to a further aspect of the invention, the nozzles of the sprayer assembly are high pressure and minimal flow rate nozzles and may be configured to conserve water while providing sufficient pressure and volume to erode clumps of soil clinging to the root system.

According to a further aspect of the invention, a conveyor system may be included so that plants can be positioned on the conveyor system, passed through the sprayer assembly, and then be removed from the conveyor. This setup may reduce or eliminate safety risks associated with the use of high pressure water sprayers.

According to a further aspect of the invention, the sprayer assembly may be incorporated into a combination harvester that cuts plants to a specified height and removes the plant and root system from the field prior to cleaning the root system with the sprayer assembly.

According to a further aspect of the invention, a recycling system may be incorporated to capture the expended water and dislodged soil in order to process the water and soil combination in order to recycle the water back to the sprayer assembly while depositing the soil either into a reservoir or into a field.

According to a further aspect of the invention, the sprayer assembly, including a conveyor system and recycling system, may be incorporated into a combination harvester that extracts the stem and root system of a plant from surrounding soil, transports the plant and root system to the conveyor system, utilizes the sprayer assembly to remove the soil from the plant root system, and recycles the dislodged soil back into the field while recycling the expended water back to the sprayer assembly and indexes the cleaned plant for further testing. An auxiliary water reservoir may be included to replenish the sprayer assembly as needed.

DETAILED DESCRIPTION

The following description is merely exemplary in nature and is not intended to limit the present disclosure, application, or uses. For a better understanding of the invention, several exemplary embodiments will now be described in detail. Reference will be taken from time to time to the appended drawings. Reference numerals will be used to indicate certain parts or locations in the drawings. These same reference numerals will indicate the same parts or locations throughout the drawings, unless otherwise indicated.

Figure 1:
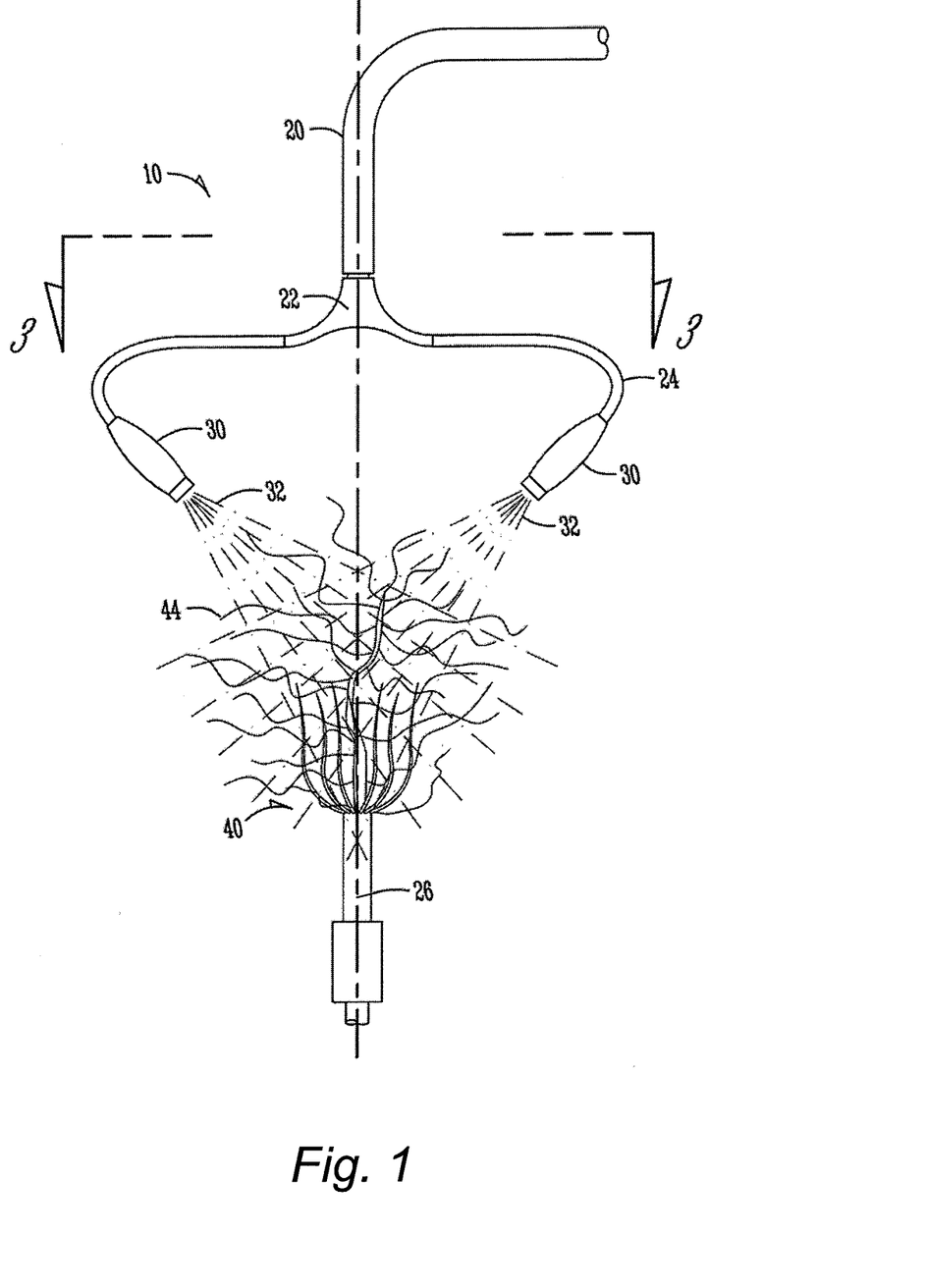
FIG. 1 is an enlarged view of a sprayer assembly configured for cleaning a plant root system in accordance with one embodiment of the present invention.

FIG. 1 shows an enlarged view of a sprayer assembly 10 configured for cleaning a plant root system in accordance with one embodiment of the present invention. In the depicted embodiment, the sprayer assembly 10 generally comprises a water line 20 attached to a swivel junction 22 with a pair of pipes 24 leading to a pair of respective nozzles 30. The nozzles 30 are angled inwardly toward an axis 26 defined by the center of a plant 40 to be cleaned. The nozzles 30 are also angled so that as water flows through the nozzles 30, the swivel junction 22 rotates on an end of the water line 20. In this manner, water ejected through the nozzles 30 impinges directly onto a soil-covered plant root system 44 positioned beneath the sprayer assembly 10. By rotating the nozzles 30, pressurized water spray 32 is directed onto the various surfaces of the plant root system 44. In such a manner, the repetitive impingement of the water ejected through the nozzles 30 acts to systematically erode soil and other non-root material from the root system 44.

It should be noted that in other embodiments there may be more than two pipes 24 extending from the swivel junction 22. In addition, although the water line 20, swivel junction 22, pipes 24, and nozzles 30 of FIG. 1 are shown having particular designs, in other embodiments any combination, or all, of these components may have other designs. For example, in some embodiments the swivel junction 22 may have a T-shape. In addition, although in the depicted embodiment the nozzles rotate via rotation of the swivel junction 22, in other embodiments the water line 20 (or a portion thereof) may rotate to effect rotation of the nozzles 30. Additionally, in other embodiments the nozzles 30 may be mechanically rotated by other means. For example, in some embodiments the nozzles 30 may be rotated via an external drive system, which may include, but need not be limited to, rotating the nozzles 30 via the use of belts, chains, and/or gears.

In the depicted embodiment, water is used to wash the plant root system. In some embodiments, however, the water may include additives, such as surfactants and/or other materials configured to enhance cleaning efficiency. In other embodiments, materials other than water may be used to wash the plant root system.

While the nozzles 30 have been generally described as rotating with the swivel junction 22, it may be preferable instead to rotate the plant root system 44 relative to the nozzles 30. This action would have the additional benefit of imparting centrifugal force onto the root system 44 of the plant 40 to be cleaned, which tends to release soil from the root system 44, in addition to providing water spray 32 to the various surfaces of the root system 44. In other embodiments both the nozzles 30 and the root system 44 may be rotated relative to each other, in the same direction in some embodiments and in opposite directions in other embodiments. Also, in some embodiments the nozzles 30 may rotate around the plant 40 in other ways, such as, for example, around an axis that extends perpendicular to axis 26 such that the nozzles rotate in the same plane as the paper in FIG. 1. In further embodiments, the plant 40 may be oriented upright such that the nozzles 30 spray substantially inward and upward rather than substantially inward and downward as shown in FIG. 1.

Figure 2:
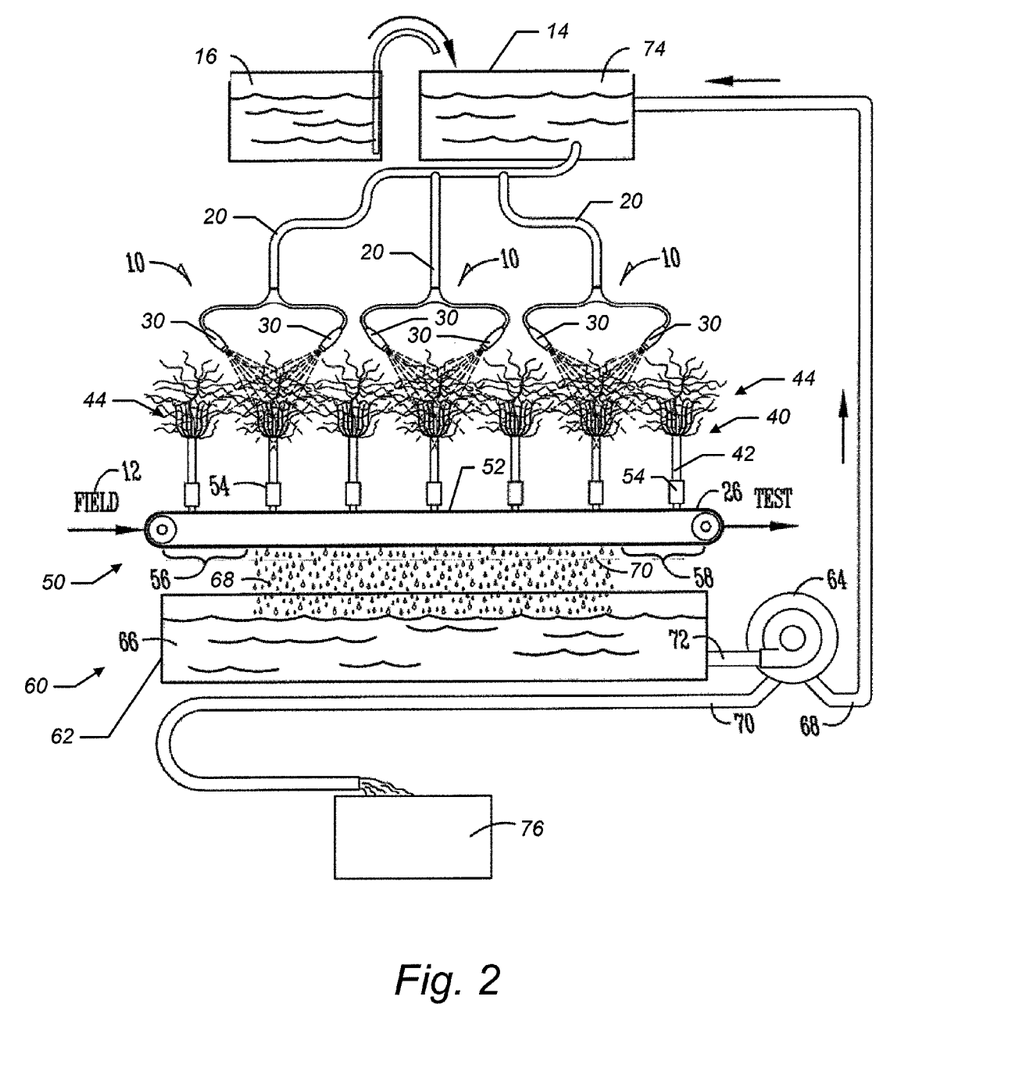
FIG. 2 is a schematic drawing of a plant root cleaning system in accordance with one embodiment of the present invention.

FIG. 2 shows a schematic drawing of a plant root cleaning system in accordance with one embodiment of the present invention. As shown in the figure, disclosed with the sprayer assembly 10 is a conveyor system 50 which passes plants 40 past the nozzles 30. The conveyor 50 comprises a belt 52 or other continuous loop member and a plurality of holding members 54, which in various embodiments may comprise posts, grips, or other apparatuses for holding plants in place. The holding members 54 receive the plants 40 which are positioned upside down so that the sprayer assembly 10 is able to fully and effectively clean the root systems 44 of the plants 40. The conveyor 50 extends beyond the sprayer assembly 10 providing both a loading area 56 and an unloading area 58 so that an operator is kept out of the spray zone of the sprayer assemblies 10. Although not shown in the figure, the depicted embodiment of FIG. 2 also includes a safety cover that covers various components of the system.

It should be noted that in other embodiments, the conveyor 50 need not have a linear design. For example, in some embodiments the conveyor 50 may have a circular or oval design, and some of these embodiments may include loading and unloading areas that are proximate each other. In other embodiments, the conveyor may have a spiral design, which in some embodiments may extend upward. Some of these embodiments may include a loading area at the top of the spiral and an unloading area at the bottom of the spiral (or vice versa). In some further embodiments, the plants may be moved past a collection of stationary nozzles.

In the depicted embodiment, the nozzles 30 are of the type that allows high pressure and a relatively low (e.g., minimal) flow rate. This arrangement allows water to be conserved while allowing high pressure spray 32 to impinge directly onto the soil covered root systems 44 of the plants 40. To enable this conservation, water may be provided through the water line 20 at a sufficiently high pressure so that the soil may be effectively cleared from the root systems 44 of the plants 40.

Figure 3:
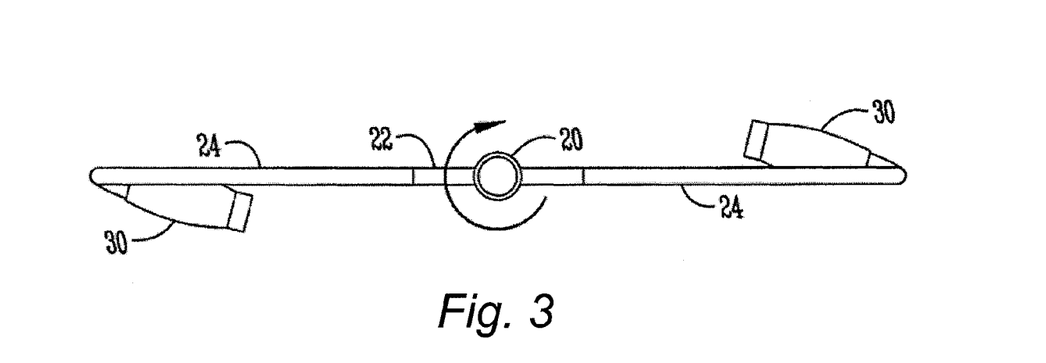
FIG. 3 is a view of the sprayer assembly taken along line 3-3 of FIG. 1 in accordance with one embodiment of the present invention.

FIG. 3 is a view of the sprayer assembly taken along line 3-3 of FIG. 1. In the depicted embodiment, the nozzles 30 are angled with respect to each other and the swivel junction 22 to effect rotation of the nozzles 30 upon flow of water through the system. It should also be noted that in various embodiments the orientation of the spray pattern produced by the nozzles 30 may vary. For example, in FIG. 2 the nozzles 30 are adjusted such that the spray pattern is parallel to the plane of the paper. In other embodiments, the nozzles 30 may be adjusted such that the spray pattern has other orientations. For example, in some embodiments the nozzles 30 may be adjusted such that the spray pattern is parallel to plane of the paper in FIG. 3. It should also be noted that in some embodiments the nozzles 30 may be configured to move independent from the rotation of the swivel junction 22. In such a manner, in some embodiments the nozzles 30 may not only rotate relative to the plant root system 44 but may also perform a waving motion.

Figure 4:
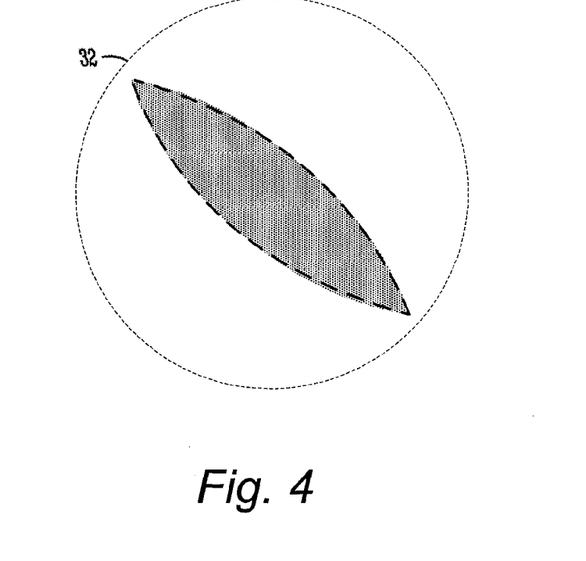
FIG. 4 is a view of a spray profile of one embodiment of the present invention.

It is further preferred that the nozzles 30 are a flat type providing a relatively flat tapered spray pattern (as shown in FIG. 4) with an approximate 15 degree distribution of spray 32 pattern from the nozzle 30 (as shown in FIG. 1). This has been determined to be the preferred nozzle 30, for example, for clearing soil from the root ball of a corn plant. However, other spray patterns, distribution angles, or combinations are anticipated. The number, arrangement, or type of nozzle 30 may be experimentally determined to provide the optimum cleaning of a particular plant root system 44. Additionally, all of the nozzles 30 utilized do not need to be of the same spray distribution 32 or type and may vary according to the particularized needs of the desired operation. In addition, in some embodiments the nozzles 30 may be adjustable and thus may provide variable angles and/or spray patterns.

Referring back to FIG. 2, in the depicted embodiment, the holding members 54 comprise posts that receive the cut stalks 42 of corn plants 40. Corn stalks 42 may be cut to a predetermined height and placed on the holding members 54 of the conveyor 50 thereby ensuring that the root systems 44 of the corn plants 40 are at a preferred height to facilitate cleaning. The holding members 54 may also be tapered or stepped so that corn stalks 42 of varying diameters may be placed thereon. In some embodiments, the holding members 54 may be annular and/or may be self-adjusting. For example, in some embodiments they may employ cam lock or eccentric lock mechanisms. In some embodiments, the plant root cleaning system may also include a vision system that is configured to evaluate or score each plant root system 44 after it has been cleaned. Root measurements may be useful in plant breeding, such as for corn or other crops.

Also contemplated to be used with this apparatus is a recycling system 60. The recycling system 60 comprises first a reservoir 62 which collects the expended water 68 and dislodged soil 70 generated during the cleaning process. The reservoir 62 is in communication, through a pipe or other gate 72, with a centrifuge 64 or other apparatus for separating the dislodged soil 70 from the expended water 68. The centrifuge 64 collects the soil and water mixture 66 from the reservoir 62 and rotates at high speed to separate the soil 70 from the water 68. In particular, the rotational movement of the centrifuge 64 separates the denser soil particles 70 from the less dense water 68. The centrifuge 64 then has a water outlet 74 and a soil outlet 76, which each may be a separate reservoir or other storage container. In some embodiments, the soil 70 may then be returned to a field, such as, for example, the field from which the plants 40 were dug, thereby reducing the need to replenish the soil in the field or otherwise haul away the output soil. In some embodiments, the water outlet 74 delivers the separated water 68 directly to the water line 20 or other water source supplying the water line 20 (such as, for example, reservoir 74 as shown in FIG. 2), thereby reducing the consumption of water required during operation of the sprayer assembly 10.

While the recycling system 60 preferably separates the water 68 completely from the soil 70, in practice it may be difficult to accomplish complete separation. Therefore, in some embodiments the centrifuge may be able to recover 50% or more of the expended water 68 and return it for use in the spraying process. In other embodiments, however, it is anticipated that with sufficient separation, nearly 100% of the water may be recovered. Although in some embodiments, the water 68 may contain some of the dislodged soil 70, the centrifuge process removes a significant amount of the large material from the water/soil mixture 66 so that particulate matter from the dislodged soil 70 does not clog the nozzles 30 when the recycled water 68 is again sprayed onto a new root system 44. It should be noted that in some embodiments, a screen may be included downstream of the centrifuge 64 and prior to the nozzles 30. The remaining water carrying the large particulate matter from the dislodged soil 70 is used to transport the soil back to either the field from which the plants 40 were removed or into a reservoir for holding the soil. While in various embodiments the recycling system 60 is preferred to conserve the amount of water used, its inclusion is not necessary and the invention may be practiced without it. It should be noted that in some embodiments additional separators (such as, for example, second, third, etc. separators) may be included in the system. In various embodiments, the additional separators may be included in series, parallel, or combinations thereof. Also, in some embodiments the first reservoir 62 may include a device (such as, for example, a dumping device), which may be configured to dump soil that may have settled in the bottom of the reservoir 62.

Further anticipated by the present disclosure is a combination plant harvester (not shown) and sprayer assembly. This combined apparatus is intended to be operated in a field growing plants which are to be tested. The combined apparatus includes a blade for cutting a plant (for example a stalk of a corn plant) to a specified height or stalk length. The combined apparatus also includes a scoop, shovel, or other digging apparatus to remove the entire root system 44 of the plant (such as, for example, the root ball of a corn plant) from the surrounding soil. The combined apparatus further includes a conveyor system and sprayer assembly as described above for receiving the plant root system and cleaning the soil from the root system. In some embodiments, the combined apparatus may include a root system shaking station (not shown) wherein the root system 44 is mechanically shaken before being received by the sprayer assemblies. The combined apparatus also includes a main reservoir 14 from which the water line draws water to clean the plant root system 44. Preferably, the combined apparatus also includes a recycling system 60 as previously described, wherein the water outlet is in communication with the main reservoir 14 to resupply the recycled water into the sprayer assembly 10, and the soil outlet distributes dislodged soil back into the field. Also included is an auxiliary reservoir 16 which periodically replenishes the main reservoir 14 when the water level reaches a predetermined point due to losses in the recycling system 60. In some embodiments, such as, for example, embodiments where the availability of clean water is limited, the auxiliary reservoir 16 may be filled overnight. In some embodiments, the combination plant harvester and plant root cleaning system may also include a measurement system configured to collect data from the cleaned plant root system. In some embodiments, the measurement system may comprise a vision system that is configured to evaluate or score each plant root system after it has been cleaned.

While each of the above embodiments of the invention as disclosed uses a sprayer assembly 10 that includes two or more nozzles 30, it is anticipated by this disclosure that other sprayer assemblies may have one nozzle or three or more nozzles. In addition, a number of sprayer assemblies 10 may be set up in series as shown in FIG. 2, with each sprayer assembly 10 having the same or a differing configuration of spray patterns such that as a plant 40 passes along the conveyor system 50, it is impacted by a variety of spray 32 configurations to dislodge the soil 70 attached to the plant root system 44. For example, in a particularly dry environment, a first sprayer assembly 10 may provide soaking of the soil about the root system 44 of a plant 40 while a second sprayer assembly 10 may provide high pressure spray 32 to dislodge large pieces of soil and a sprayer assembly 10 may provide a lower pressure and finer spray 32 to finish cleaning the soil from the root system 44 of the plant. These nozzles 30 may be either permanently affixed to the sprayer assemblies 10, or the nozzles 30 may be replaced according to the particularized needs of the particular plant 40 or environment. In addition, in some embodiments stationary nozzles may be included. For example, referring to FIG. 2, stationary nozzles (not shown) may be included proximate the conveyor belt 50 wherein the stationary nozzles are configured to spray upward. In other embodiments, stationary nozzles (not shown) may be included that are configured to spray across the series of root systems 44.

In order for the erosion process to work more efficiently and avoid soil merely being pushed from one side to the other of the root system 44, the nozzles 30 are positioned at a proper angle relative to the root system 44. In a high throughput system, there may be a large variation in the size of plants 40 and their accompanying root systems 44 as well as variation in the amount of soil contained on an individual root system 44. Therefore, it may be preferable to include a sensor and/or automated adjuster to vary the intensity, flow rate, and angle of the nozzles for each individual plant 40 to be cleaned. In a system where sprayer assemblies 10 are aligned in series, individual nozzles 30 or sprayer assemblies 10 may be turned on or off depending on the needs as detected by the sensor. Some embodiments may also include one or more sensors that sense the quality of the water received in the first reservoir 62. For example, in some embodiments a sensor may be configured to sense the presence of root material, which may indicate that the nozzles are removing too much material and may be damaging or removing the root system 44 itself.

Also anticipated by the present disclosure is a method for cleaning plant root systems, especially the root ball of a corn plant, in a high throughput manner while preserving the integrity of the root system. The steps generally involved in carrying out such a method include positioning a plant having a root system adjacent a sprayer assembly, and providing water flow through the sprayer assembly to remove soil from the plant root system. As the cleaning process is undertaken, either the plant, the sprayer assembly, or both are rotated, thereby ensuring equal coverage of the spray about the root system of the plant to dislodge the soil attached to the root system.

Also anticipated by this disclosure is the use of a recycling system to reuse some of the expended water and to return some of the dislodged soil to the field. In general, as the sprayer assembly erodes soil from the plant root system the expended water and dislodged soil are collected into a reservoir. The reservoir is in fluid communication with a centrifuge or like separating system. The centrifuge separates the water and soil mixture into two parts: a first part containing mostly water, potentially including a small amount of particulate from the soil suspended therein; and a second part, containing mostly soil, possibly containing a small amount of water therein. According to optimal operating conditions, the particulate matter suspended within the water part is of a consistency so fine so as not to obstruct or clog the nozzles of the sprayer assembly. The mostly water part is preferably routed into either a main reservoir or directly into the water line providing pressurized water flow to the nozzles. The second part is routed either into a storage container or is directly returned to the field from which the plants were extracted. In practical applications, approximately 50-80% of the water expended to remove the soil from the plant root system may be recaptured, along with most of the dislodged soil being returned to the field.

Figure 5:
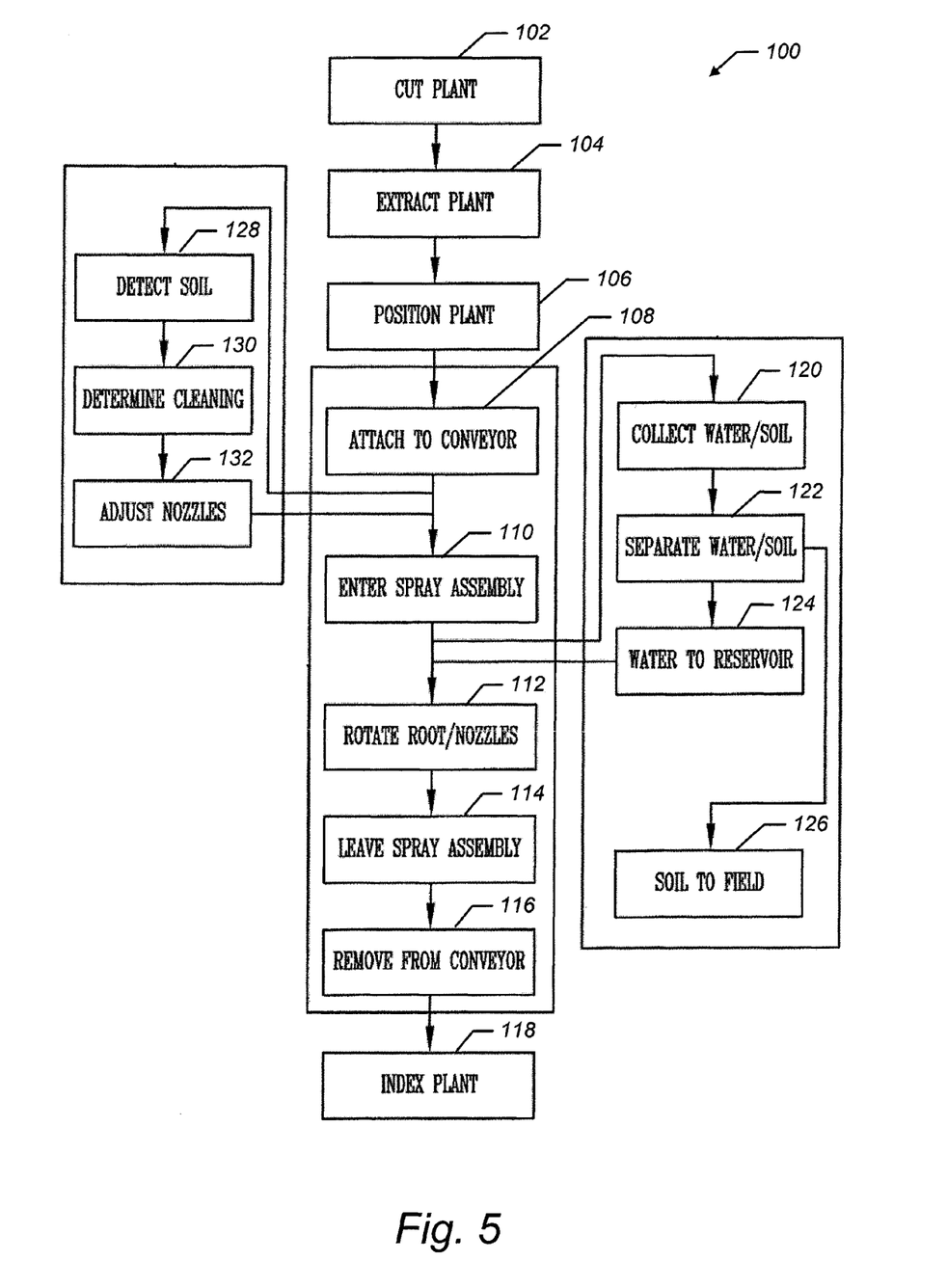
FIG. 5 is a flowchart of a method for cleaning a plant root system in accordance with one embodiment of the present invention.

FIG. 5 shows a flowchart of a method for cleaning a plant root system in accordance with one embodiment of the present invention. In the figure, the method generally includes extracting plants from the surrounding soil in a field, cleaning the soil from the root system of the plants, and recycling the dislodged soil back into the field. In the depicted embodiment, a combination harvesting and cleaning vehicle is provided. Referring to the figure, in block 102, the combined vehicle cuts plants, such as corn plants, to a predetermined height. In block 104, the plants are extracted from the soil, such as by digging about the base of the plant. Other means of removing the plant from the soil, such as pulling by the stem may be employed; however pulling may tend to break weaker stems or leave the fine roots in the soil. In block 106, the plants are positioned on a conveyor belt, the conveyor belt including a number of holding members (such as, for example, posts or other mechanical means) for holding the plant in an upright position to expose the root system. In block 108, the plants are attached to the conveyor belt. In block 110, the conveyor belt passes through one or more sprayer assemblies. In block 112, the sprayer assemblies and/or the root systems are rotated, thereby providing even coverage of pressurized water to all parts of the plant root system. In block 114, the plant exits the sprayer assemblies, and in block 116, the plant is removed. Optionally, in block 118, an identifying device, such as tag, barcode, RFID chip, or other means known in the art, is attached to the plant and root.

Operating concurrently with the washing process is a recycling process. In the depicted embodiment, the recycling process includes the following steps. In block 120, the water and soil mixture is collected into a reservoir or tank. In block 122, the water and soil mixture is transferred to a centrifuge or other separating apparatus, wherein the centrifuge or a separating apparatus is engaged to divide the water and soil mixture into two parts: a mostly water part and a mostly soil part. In block 124, the mostly water part is transferred to a main reservoir from which the sprayer assembly draws pressurized water. In block 126, the mostly soil part is returned to the field, the mostly soil part having some amount of water to allow ease of transfer. Optionally, the combined vehicle may also include an auxiliary water tank, which is used to replenish the main reservoir when the water level reaches a predetermined value, indicating a shortage.

As previously indicated, the root cleaning system may include one or more spraying stations, each station having a separate arrangement of nozzles and/or pressure distributions. The purpose of such an arrangement would be to remove soil from the plant root system in a series of steps rather than removing all of the soil in one operation.

Also included in the embodiment depicted in FIG. 5 is a method for detecting a root system and modifying a sprayer assembly in order to support a high throughput cleaning of roots. This method includes the following steps. In block 128, a sensing device, such as digital optical recognition, weight sensing, or other automated or manual sensing means, is provided which detects the size of the root system of a particular plant as well as determining the amount of dirt impacted about the root system. In block 130, an automated adjusting means is included with the sprayer assembly to determine the flow rate of water through the nozzles, pressure of water through the nozzles, angle upon which the nozzles impact the root system, positioning of the sprayer assembly, rotational speed of the sprayer assembly, or, in the case of a series of sprayer assemblies, a combination of sprayer assemblies to engage. In block 132, any necessary adjustments to the various components are made. Once the spraying process and any necessary adjustment have been determined, the plant and root system are passed into the sprayer assembly, or through the series of sprayer assemblies, and the root systems are cleaned of soil. Optionally, a post cleaning inspection is performed, by either by an operator or through some automated process, such as optical recognition, analysis of discarded water, or other similar means.

Also anticipated by the present disclosure is a system for automated and high throughput cleaning and/or identifying of a plant, e.g., for parasite testing, physiological analysis, or genetic determination. One example of the system includes an apparatus for automatic cutting and extracting of a plant and root system from a field, one or more stations for automatic and high throughput cleaning of the soil from the root system of a plant, a recycling system for recapturing expended water and dislodged soil from the plant, one or more reservoirs for storing water and/or dislodged soil, and an identifying station. The automated spraying means preferably contains one or more nozzles adapted to pivot about a central point so as to deliver pressurized water stream about the entirety of the root system. Also included in the system is an automated transport means, such as a conveyor belt or other continuous loop member, having a number of indexed positions thereon. The transport means passes plants from the extraction station through the sprayer assembly and to the removal and/or identifying station. In a preferred form for use with corn plants, the automated transport means uses the hole in the stem of a corn plant to transport the plant and root among the several stations.

The embodiments of the present invention have been set forth in the drawings and specification and although specific terms are employed, these are used in a generically descriptive sense only and are not used for purposes of limitations. Changes in the formed proportion of parts, as well as any substitutions of equivalences are contemplated as circumstances may suggest or are rendered expedient without departing from the spirit and scope of the invention as further defined in the following claims.

What is claimed is:

1. A method of cleaning a plant having a soil covered root system, said method comprising the steps of:
    positioning the plant in an inverted position on a conveyor system with the root system exposed;
    detecting a type of soil, an amount of soil present on the root system and a size of the root system;
    providing a sprayer assembly having a swivel junction and at least one nozzle positioned below said swivel junction, said at least one nozzle positioned so that spray produced by the at least one nozzle impacts the root system at a predetermined rotation;
    providing a stream of water from a reservoir through the at least one nozzle of the sprayer assembly;
    adjusting at least one of a flow rate of the stream of water through the at least one nozzle, a pressure of the stream of water through the at least one nozzle, or a spray pattern of the at least one nozzle based on the type of soil, the amount of soil present on the root system and the size of the root system;
    positioning the plant adjacent the sprayer assembly by operating the conveyor system;
    spraying the stream of water with the at least one nozzle and rotating at least one nozzle relative to the plant to remove the soil from the root system, thereby cleaning the plant root system.

2. The method of claim 1, further comprising providing a plurality of nozzles below said swivel junction.

3. The method of claim 1, further comprising detecting the presence of the root system.

4. The method of claim 1, further comprising:
    providing a field having a plurality of plants each having a stalk and a root system;
    cutting the stalk of one of the plurality of plants to a predetermined height;
    inverting the stalk and root system; and
    placing inverted the stalk and root system onto the conveyor system.

5. The method of claim 1, further comprising:
    providing a portion of the plant having a stalk; and
    cutting the stalk of the plant to a predetermined height.

6. The method of claim 1, further comprising capturing the water expended through the nozzle and dislodged soil from the root system within a receptacle.

7. The method of claim 1, wherein the sprayer assembly includes a water supply in fluid communication with the nozzle.

8. The method of claim 1, further comprising rotating the nozzle relative to the plant to adjust an angle upon which the spray impacts the root system to remove the soil from the root system.

9. The method of claim 1, wherein the nozzle is angled so that the swivel junction rotates as water flows through the nozzle.

10. The method of claim 1, wherein the nozzle comprises one of a flat spray profile and a cone spray profile.

11. The method of claim 1, wherein the sprayer assembly includes a recycling system for capturing expended water and dislodged soil, and then reusing the expended water.

12. The method of claim 3, further comprising using a sensor to detect the presence of the root system.

13. The method of claim 5, further comprising:
    inverting the cut stalk and root system; and
    placing the inverted cut stalk and root system onto the conveyor system.

14. The method of claim 6, further comprising separating the expended water from the dislodged soil.

15. The method of claim 6, further comprising expelling the dislodged soil back into a field.

16. The method of claim 6, further comprising returning the expended water into a reservoir.

17. The method of claim 6, further comprising:
    expelling the dislodged soil back into a field; and
    expelling a portion of the expended water with the dislodged soil into a field.

18. The method of claim 11, wherein the recycling system comprises a centrifuge to separate dislodged soil from the expended water.

19. The method of claim 11, wherein the recycling system includes a water line for connecting to a master reservoir to deposit reusable expended water from the recycling system into the master reservoir.

20. The method of claim 11, wherein the recycling system includes an auxiliary reservoir for connecting with a master reservoir to provide additional water to the master reservoir to account for losses in the recycling system.

* * * * *